United States Patent
Shikano et al.

(10) Patent No.: US 7,338,693 B2
(45) Date of Patent: Mar. 4, 2008

(54) PRESSURE-SENSITIVE ADHESION-PROCESSED SHEET

(75) Inventors: Tamio Shikano, Tokyo (JP); Katsukuni Nitta, Tokyo (JP); Koichi Ishida, Tokyo (JP)

(73) Assignee: Yupo Corporation, Tokyo (JP)

( * ) Notice: Subject to any disclaimer, the term of this patent is extended or adjusted under 35 U.S.C. 154(b) by 0 days.

(21) Appl. No.: 11/246,138

(22) Filed: Oct. 11, 2005

(65) Prior Publication Data

US 2006/0051551 A1    Mar. 9, 2006

Related U.S. Application Data

(63) Continuation of application No. PCT/JP03/12994, filed on Oct. 9, 2003.

(30) Foreign Application Priority Data

Apr. 10, 2003   (JP)   ............................ 2003-106356

(51) Int. Cl.
*B32B 33/00* (2006.01)
*B32B 3/10* (2006.01)
*B32B 3/00* (2006.01)

(52) U.S. Cl. .................... 428/40.1; 428/42.3; 428/131; 428/141; 428/156

(58) Field of Classification Search ............... 428/40.1, 428/42.3, 131, 141, 156, 157, 161, 172, 192, 428/194, 195.1, 201, 202
See application file for complete search history.

(56) References Cited

U.S. PATENT DOCUMENTS

| | | | |
|---|---|---|---|
| 3,906,578 A | * | 9/1975 | Huber .................... 15/104.002 |
| 6,197,397 B1 | | 3/2001 | Sher et al. |
| 6,238,762 B1 | * | 5/2001 | Friedland et al. ............. 428/43 |

FOREIGN PATENT DOCUMENTS

| | | |
|---|---|---|
| JP | 59-53787 | 3/1984 |
| JP | 59-78285 | 5/1984 |
| JP | 9-141812 | 6/1997 |
| JP | 10-219208 | 8/1998 |
| JP | 11-323790 | 11/1999 |
| JP | 2000-63779 | 2/2000 |
| JP | 2002-332463 | 11/2002 |
| WO | WO 03/039884 | 5/2003 |

* cited by examiner

*Primary Examiner*—Patricia L Nordmeyer
(74) *Attorney, Agent, or Firm*—Oblon, Spivak, McClelland, Maier & Nuestadt, P.C.

(57) ABSTRACT

A pressure-sensitive adhesion-processed sheet which can be easily stuck without forming blisters by air-entrapment, is less expensive, can be easily re-stuck, and has favorable working characteristics. The pressure-sensitive adhesion-processed sheet includes a sheet base material and a pressure-sensitive adhesive layer having plural small valleys and plural small peaks.

15 Claims, 1 Drawing Sheet

Fig. 1
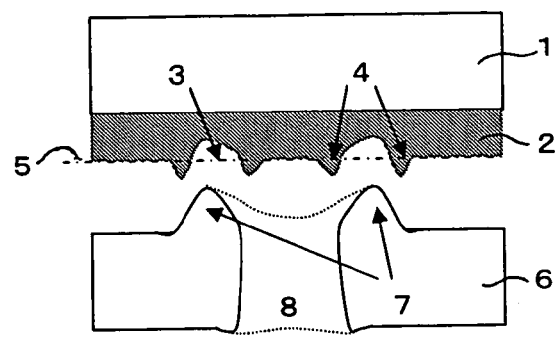
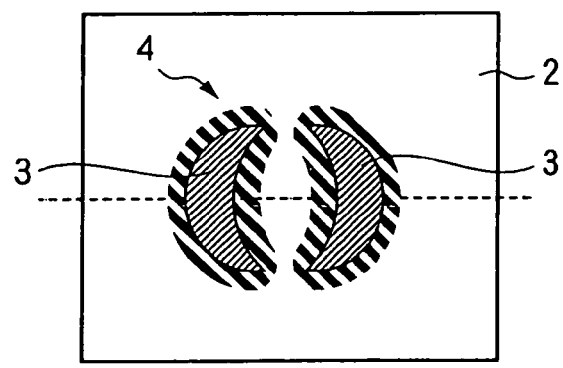
Fig. 2
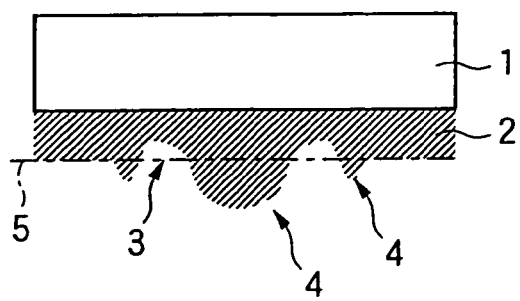
Fig. 3
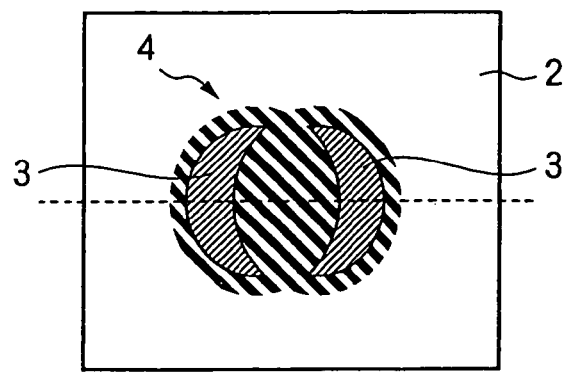
Fig. 4

PRESSURE-SENSITIVE ADHESION-PROCESSED SHEET

CROSS-REFERENCE TO RELATED APPLICATIONS

The present application is a by-pass continuation under U.S.C. § 365(c) of PCT/JP03/12994 filed on Oct. 9, 2003, and in turn claims priority to JP 2003-106356 filed on Apr. 10, 2003, the entire contents of each of which are hereby incorporated herein by reference.

DISCUSSION OF THE BACKGROUND

1. Field of the Invention

This invention relates to a pressure-sensitive adhesion-processed sheet to be used in stickers, labels and so on.

2. Background of the Invention

Existing pressure-sensitive adhesion-processed sheets comprise a pressure-sensitive adhesion-processed sheet constructed by forming a flat pressure-sensitive adhesive layer on a sheet base material and a release sheet bonded to the flat pressure-sensitive adhesive layer. In use, the release sheet, which usually has a flat releasing-treated face, is peeled off and the pressure-sensitive adhesive layer of the pressure-sensitive adhesion-processed sheet is stuck to an adherend.

These pressure-sensitive adhesion-processed sheets frequently suffer from such a problem that air is entrapped between a pressure-sensitive adhesion-processed sheet and an adherend and then blisters are formed due to the entrapped air. After sticking, therefore, convexities are formed on the front face of the pressure-sensitive adhesion-processed sheet and its appearance is seriously damaged. This problem is particularly serious in the case of using a large-sized pressure-sensitive adhesion-processed sheet or an adherend having a smooth surface.

In the case of using a plastic adherend (for example, polycarbonate resin, acrylic resin, foamed polystyrene resin or the like), it is sometimes observed that a gas is generated from the plastic surface with the passage of time so that blusters are formed on the pressure-sensitive adhesion-processed sheet.

To overcome the above-described problems, various pressure-sensitive adhesion-processed sheets have been proposed by Japanese Utility Model Registration No.2503717, JP-A-3-243677 and so on. However, these techniques are poor in productivity and yet expensive compared with the existing pressure-sensitive adhesion-processed sheets.

SUMMARY OF THE INVENTION

Under these circumstances, an object of the present invention is to provide a pressure-sensitive adhesion-processed sheet which can easily adhere without forming blisters during or after adhering, has a high productivity and is less expensive, thereby solving the above-described problems.

To achieve the above-described object, the present inventors have conducted intensive studies and, as a result, found out that a pressure-sensitive adhesion-processed sheet comprising a sheet base material and a pressure-sensitive adhesive layer having a large number of small valleys and a large number of small peaks can be produced at a low cost and is free from blustering in sticking to an adherend, and the working characteristics can be largely improved without damaging the appearance of the pressure-sensitive adhesion-processed sheet.

Accordingly, the present invention provides a pressure-sensitive adhesion-processed sheet comprising a sheet base material and a pressure-sensitive adhesive layer having a large number of small valleys and a large number of small peaks.

In a preferred embodiment of the pressure-sensitive adhesion-processed sheet according to the present invention, it is preferred that the pressure-sensitive adhesion-processed sheet comprises a sheet base material, a pressure-sensitive adhesive layer having a large number of small valleys and a large number of small peaks, and a release sheet having a large number of bosses and a large number of punch hole structures. It is preferred that the pressure-sensitive adhesive layer has a basic flat face in the face that is in contact with the release sheet and the small valleys are concavities in the basic flat face while small peaks protrude from the basic flat face. It is preferred that the depth of the small valleys ranges from 1 μm inward from the basic flat face to the thickness of the pressure-sensitive adhesive layer and the height of the small peaks ranges from 1 μm to 150 μm outward from the basic flat face.

It is also preferred that the cross-sectional shape of the small valleys in a face parallel to the basic flat face is at least one member selected from the group consisting of circular, elliptic, doughnut, crescent and n-gonal (wherein n is a positive integer of 3 or more) shapes, more preferably at least one member selected from between doughnut and crescent shapes. Similarly, the cross-sectional shape of the small peaks in a face parallel to the basic flat face is at least one member selected from the group consisting of circular, elliptic, doughnut, crescent, calabash and n-gonal (wherein n is a positive integer of 3 or more) shapes, more preferably at least one member selected from among doughnut, crescent and calabash shapes. It is particularly preferred that the small peaks are formed adjacent to the small valleys along the outline of the bottom thereof on the basic flat face.

Also, it is preferred that the small valleys are scattered at intervals among one another on the basic flat face. It is preferred that the small valleys are distributed at a density of from 10 to 10,000 valleys/cm². It is preferred that the small peaks are scattered at intervals among one another on the basic flat face. It is preferred that the small peaks are distributed at a density of from 10 to 10,000 peaks/cm².

Also, it is preferred that the maximum width of the bottom of the small peaks on the basic flat face is from 1 to 1,500 μm.

It is preferred that the thickness of the bosses in the release sheet is larger by 1 μm or more than the thickness of the non-punched part of the release sheet. It is also preferred that the release sheet is made of a thermoplastic resin.

FIG. 1 shows an example of the sectional view of the fundamental constitution of the pressure-sensitive adhesion-processed sheet according to the present invention. FIG. 2 is a schematic illustration of this pressure-sensitive adhesion-processed sheet observed from the perpendicular direction in the pressure-sensitive adhesive layer side (overhead view).

FIG. 3 shows another example of the sectional view of the fundamental constitution of the pressure-sensitive adhesion-processed sheet according to the present invention. FIG. 4 is a schematic illustration of this pressure-sensitive adhesion-processed sheet observed from the perpendicular direction in the pressure-sensitive adhesive layer side (overhead view).

In these figures, 1 indicates a sheet base material, 2 indicates a pressure-sensitive adhesive layer, 3 indicates a small valley, 4 indicates a small peak, 5 indicates the basic flat face, and 6 indicates a release sheet.

Since the release sheet 6 has small bosses 7 and punch hole structures 8, the shape of the release sheet 6 is transferred onto the pressure-sensitive adhesive layer 2 during the pressure-sensitive adhesion processing. As a result, a large number of small valleys 3 and small peaks 4 corresponding thereto are formed in the pressure-sensitive adhesive layer 2.

Since the pressure-sensitive adhesive layer 2 has these small valleys 3 and small peaks 4, the small peaks 4 in the pressure-sensitive adhesive layer 2 fist stick to an adherent when the pressure-sensitive adhesion-processed sheet 2 is lightly pressed against the adherent. Thus, a space connected to the outside is formed between the basic flat face of the pressure-sensitive adhesive layer 2 and the adherend surface. As a result, air existing between the pressure-sensitive adhesion-processed sheet 2 and the adherend can be mostly eliminated via the space connected to the outside and thus no large and uneven blister is formed at sticking. Since a minor amount of air remaining in the space between the pressure-sensitive adhesion-processed sheet 2 and the adherent is pooled in the small valleys 3, working operation can be completed without worsening the appearance.

Since the pressure-sensitive adhesive layer 2 has the basic flat face, the basic flat face of the pressure-sensitive adhesive layer 2 is constantly adhered to the adherend face when the pressure-sensitive adhesive layer 2 is strongly pressed against the adherent. Thus the continuous space between the pressure-sensitive adhesive layer 2 and the adherent disappears and a high adhesion strength can be established. When strongly pressed, the small valleys 3 do not stick to the adherent. In the case where a gas is generated from a plastic adherend, the gas is uniformly pooled in the small valleys 3. Thus, no large and uneven blister is formed after the completion of the working operation and, therefore, the appearance is not seriously damaged.

When the pressure-sensitive adhesion-processed sheet 2 is lightly pressed against the adherend, the small peaks 4 in the pressure-sensitive adhesive layer 2 first stick closely to the adherend, thereby giving a small close-adhesion area. When the pressure-sensitive adhesion-processed sheet 2 is to be re-stuck, therefore, it can be easily peeled and re-stuck. It is also possible to lessen a lowering in the pressure-sensitive adhesion strength accompanying the peeling.

Owing to the advantages as discussed above, the pressure-sensitive adhesion-processed sheet according to the present invention can be easily positioned in the case of, for example, using as a large-sized label. Further, the working operation can be completed within a short time without a need for skill and beautiful finishing can be established.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

FIG. 1 shows an example of the sectional view of the fundamental constitution of the pressure-sensitive adhesion-processed sheet according to the present invention.

FIG. 2 is a schematic illustration of the pressure-sensitive adhesion-processed sheet of FIG. 1 observed from the perpendicular direction in the pressure-sensitive adhesive layer side (overhead view).

FIG. 3 shows another example of the sectional view of the fundamental constitution of the pressure-sensitive adhesion-processed sheet according to the present invention.

FIG. 4 is a schematic illustration of the pressure-sensitive adhesion-processed sheet of FIG. 3 observed from the perpendicular direction in the pressure-sensitive adhesive layer side (overhead view).

In these figures, the numerical symbols respectively have the following meanings.

1: sheet base material
2: pressure-sensitive adhesive layer
3: small valley
4: small peak
5: basic flat face
6: release sheet
7: bosses on release sheet 6
8: punch holes on release sheet 6

DESCRIPTION OF THE PREFERRED EMBODIMENTS (Sheet Base Material 1)

The material of the sheet base material 1 is not particularly restricted. Namely, use can be made of various base materials such as natural papers, plastic films, synthetic papers, woven fabrics and non-woven fabrics. In particular, the technique according to the present invention can be preferably applicable to plastic films such as polyolefins and polyesters or synthetic papers made of polyolefins or polyesters which are base materials fundamentally having poor air permeability. Moreover, such a base material is preferable from the viewpoint that it can be smoothly peeled off without causing breakage of the sheet base material 1t peeling owing to the high base material strength.

The thickness of the sheet base material 1 ranges from 30 to 2000 μm, preferably from 40 to 1500 μm.

(Release Sheet 6)

Examples of the material of the release sheet 6 include thermoplastic resin sheets made of, for example, polyolefin resins such as polyethylene and polypropylene, polyester resins such as polyethylene terephthalate and polyamide resins such as nylon, laminate papers having these thermoplastic resin sheets on one or both faces of natural papers, metal foils, and composite materials such as a combination of a metal foil with a thermoplastic resin sheet and a combination of a metal foil with a natural paper. Thermoplastic resin sheets are preferred and polypropylene films are still preferred.

To form bosses 7 and punch hole structures 8, the release sheet 6 is punched as will be described hereinafter. Before the punching, it is preferable that the surface in the releasing-treated face, which will serve as the basic flat face of the pressure-sensitive adhesive layer 2 later, is smooth. However, it is also possible to employ a rough surface in order to control the peeling performance.

Before applying a releasing agent to the release sheet 6, the surface of the release sheet 6 may be subjected to a surface treatment such as corona discharge, flame treatment or ozone treatment.

Examples of the releasing agent include silicone resins, fluorine resins, amino alkyd resins, polyester resins and so on and silicone resins are preferred. These agents are employed in the emulsion type, the solvent type or the solvent-free type.

From the viewpoints of handling strength, easiness in punching, etc., it is preferable that the thickness of the release sheet 6 according to the present invention ranges from 5 to 150 μm, more preferably from 10 to 130 μm.

(Punching)

Due to thermal or plastic deformation by the punching as will be described hereinafter, the punch hole periphery in the release sheet 6 according to the present invention is rolled up in the thickness direction of the sheet and thus the thickness of the punched part is larger than the non-punched part of the sheet (or the average thickness of the sheet before the punching). In the present invention, the parts having an elevated thickness by punching the release sheet 6 are referred to as bosses 7. It is preferable that the thickness of the bosses 7 is larger by 1 μm or more, more preferably by from 1 μm to the thickness of the pressure-sensitive adhesive layer 2 and particularly preferably by from 3 μm to the thickness of the pressure-sensitive adhesive layer 2, than the thickness of the non-punched part (or the average thickness of the sheet before the punching).

In the case where the thickness of the bosses 7 is larger by less than 1 μm than the thickness of the non-punched part, a sufficient peak height cannot be obtained in the release sheet 6 and, in turn, it becomes impossible to obtain a sufficient depth of the small valleys 3 in the pressure-sensitive adhesive layer 2 to be formed in the pressure-sensitive processing as will be described hereinafter. In such a case, therefore, prevention of blistering, i.e. one feature of the present invention, cannot be established.

By the punching, punch hole structures 8 are formed in the release sheet 6. The punch hole structures 8 may be either penetrating holes or semi-penetrating holes (i.e., holes not penetrating in the thickness direction of the release sheet). Moreover, the punch hole structures 8 may vary in shape or hole diameter along the thickness direction so long as the constituents of the present invention are fulfilled. It is also possible that, after forming the penetrating holes by punching the release sheet 6, the penetrating holes are closed at one side by overlaying another base material thereon to give semi-penetrating holes as the punch hole structures 8.

The depth of the punch hole structures 8 is not particularly restricted, so long as such a structure to fulfill the constituents of the present invention can be established thereby. Among all, it is preferred that the depth of the punch hole structures 8 is 1 μm or more inward from the surface of the release sheet 2, more preferably from 1 μm to the thickness of the release sheet 2 and particularly preferably from 3 μm to the thickness of the release sheet 2.

Similarly, the hole diameter of the punch hole structures 8 is not particularly restricted, so long as such a structure to fulfill the constituents of the present invention can be established thereby. More particularly speaking, the punch hole structures 8 can have a diameter of from 5 to 2,000 μm, preferably from 50 to 1,500 μm, and can be formed by the punching method as will be described hereinafter.

The thickness (height) of the bosses 7 and the depth of the punch hole structures 8 are calculated by cutting the cross section of the punched release sheet 6 with a microtome, ion-etching and gold-plating with a marketed ion coater and then observing the cross sectional shape under a scanning electron microscope (trade name: S-3000N, manufactured by Hitachi High Technologies).

To punch the release sheet 6 to thereby form the bosses 7 and the punch hole structures 8, use can be made of at least one method selected from among hot needle punching, laser beam punching, electron beam irradiation punching, plasma punching and high-voltage discharge punching. Appropriate method(s) may be selected and combined depending on the material and thickness of the release sheet 6, the processing speed and the punch hole diameter.

(Pressure-sensitive Adhesive Layer 2)

The type (material) and thickness (coating amount) of the pressure-sensitive adhesive layer 2 according to the present invention can be selected over a wide range without particular restriction depending on, for example, the material and thickness of the sheet base material 1, the usage environment (the material and conditions of an adherent, indoor or outdoor usage, temperature and humidity, usage time, etc.) and the desired strength of pressure-sensitive adhesion.

For example, the pressure-sensitive adhesive layer 2 may be formed by applying a commonly employed pressure-sensitive adhesive usually of the water-base type or the solvent type and drying. Concerning the type (material), use can be made of natural rubber, synthetic rubber, acrylic, urethane, EVA or silicone pressure-sensitive adhesives. These polymer-base pressure-sensitive adhesives may be used in the form of emulsions or dispersions dispersed in aqueous solutions.

(Coating Method)

Methods of forming the pressure-sensitive adhesive layer 2 on the sheet base material 1 are seemingly classified into two types, i.e., direct coating whereby a pressure-sensitive adhesive is directly applied to the sheet base material 1 and indirect coating whereby a pressure-sensitive adhesive is once applied on the release sheet 6. Both of these methods are applicable to the technique according to the present invention without specific restriction.

Similarly, the method of applying a pressure-sensitive adhesive is not particularly restricted. Examples thereof include comma coating, reverse coating, gravure coating, kiss coating, knife coating, bar coating, curtain coating, a method of transferring a pressure-sensitive adhesive having been applied by such a method to coated/laminated paper and so on.

The thickness (coating amount) usually ranges from 0.5 to 400 g/m² in terms of dry weight, or from 0.5 to 400 μm in terms of dry thickness.

(Method of Forming Small Valleys 3 and Small Peaks 4)

The small valleys 3 and the small peaks 4 to be provided in the pressure-sensitive adhesive layer 2 are formed as follows. By using the punched release sheet 6, the bosses 7 of the release sheet 6 bite into the basic flat face of the pressure-sensitive adhesive layer 2 to thereby form the corresponding small valleys 3 in the step of overlaying the release sheet 6 on the pressure-sensitive adhesive layer 2 (in the case of the indirect coating, the step of applying the pressure-sensitive adhesive to the release sheet 6). At the same time, the pressure-sensitive adhesive flows from the basic flat face of the pressure-sensitive adhesive layer 2 into the punch hole structures 8 in the release sheet 6 to thereby form the corresponding small peaks 4. The small valleys 3 correspond to the bosses 7, while the small peaks 4 correspond to the punch hole structures 8.

In the case of the direct coating wherein the pressure-sensitive adhesive layer 2 is directly formed on the sheet base material 1, moreover, the bosses 7 of the release sheet 6 bite into the basic flat face of the pressure-sensitive adhesive layer 2 to form the corresponding small valleys 3 in the step of overlaying the release sheet 6. At the same time, the pressure-sensitive adhesive is pushed out to form small peaks 4 like a bank around the small valleys 3. In this case, the small valleys 3 correspond to the bosses 7 but the small peaks 4 do not always correspond to the punch hole structures 8.

It is preferable that the depth of the small valleys 3 ranges from 1 μm inward from the basic flat face of the pressure-sensitive adhesive layer 2 into the thickness of the pressure-sensitive adhesive layer 2, more preferably from 3 μm inward from the basic flat face into the thickness of the pressure-sensitive adhesive layer 2. It is undesirable that the depth of the small valleys 3 is less than 1 μm. This is because, in such a case, the small valleys 3 per se are liable to stick to an adherend and a minor amount of the remaining air or a gas generated from the adherent is unevenly pooled, which results in the formation of blisters and serious worsening in the appearance.

It is preferable that the height of the small peaks 4 ranges from 1 μm to 150 μm outward from the basic flat face of the pressure-sensitive adhesive layer 2, more preferably from 3 μm to 100 μm outward from the basic flat face. It is undesirable that the height of the small peaks 4 is less than 1 μm. This is because, in such a case, the space connected to the outside between the pressure-sensitive adhesive layer 2 and the adherend is reduced in sticking the pressure-sensitive adhesion-processed sheet to the adherend. Thus, air cannot be sufficiently eliminated, which results in the formation of uneven blisters and serious worsening in the appearance. It is also undesirable that the peak height exceeds 150 μm. This is because, in such a case, the basic flat face cannot be contacted with the adherend face even though the pressure-sensitive adhesion-processed sheet is stuck to the adherend and then strongly pressed against it, which brings about disadvantages in the case where a high adhesion strength is needed.

The depth of the small valleys 3 and the height of the small peaks 4 are calculated by, after processing, adjusting the temperature of the pressure-sensitive adhesion-processed sheet to the glass transition point of the pressure-sensitive adhesive or lower, cutting the cross section thereof with a microtome, ion-etching and gold-plating with a marketed ion coater and then observing the cross sectional shape under a scanning electron microscope (trade name: S-3000N, manufactured by Hitachi High Technologies).

Although the small valleys 3 are inherently shaped by transferring the bosses 7 of the release sheet 6 without particular restriction, it is preferable that the cross-sectional shape thereof in a face parallel to the basic flat face is at least one member selected from the group consisting of circular, elliptic, doughnut, crescent and n-gonal (wherein n is a positive integer of 3 or more) shapes, more preferably at least one member selected from between doughnut and crescent shapes.

The above-described shapes are appropriately selectable in the treatment of punching the release sheet 6 according to the technique of the present invention. Doughnut and crescent shapes are particularly preferable because of being available in a less expensive molding process.

Similarly, it is preferable that the cross-sectional shape of the basic small peaks 4 in a face parallel to the basic flat face is at least one member selected from the group consisting of circular, elliptic, doughnut, crescent, calabash and n-gonal (wherein n is a positive integer of 3 or more) shapes, more preferably at least one member selected from the group consisting of doughnut, crescent and calabash shapes. It is particularly preferable that the small peaks 4 are formed adjacent to the small valleys 3 along the outline of the bottom thereof on the basic flat face.

By employing the shapes as discussed above, small blisters, if formed, are scarcely conspicuous and the appearance is not seriously damaged.

In the technique according to the present invention, the small valleys 3 and the small peaks 4 may be independently scattered at intervals among one another. In the case where the small peaks 4 are formed adjacent to the small valleys 3, a minor amount of air remaining between the pressure-sensitive adhesive layer 2 and the adherent or a gas generated from the adherend is incorporated exclusively into the small valleys 3 adjacent to the small peaks 4. Thus, uneven blistering can be effectively prevented.

It is preferable that the small valleys 3, which exist in a large number on the basic flat face, are scattered at intervals among one another. In the case where the small valleys 3 exist at an excessively high density, the ratio of the basic flat face area is lowered and thereby the adhesion force of the pressure-sensitive adhesion-processed sheet is lowered. In the case where the small valleys 3 exist at an excessively low density, there is a concern that a minor amount of air or gas may exist between the pressure-sensitive adhesive layer 2 and the adherent then cannot be incorporated therein and thus blistering arises.

It is preferable that the small valleys 3 are distributed at a density of from 10 to 10,000 valleys/cm², more preferably at a density of from 15 to 5,000 valleys/cm².

Since the small valleys 3 of the pressure-sensitive adhesive layer 2 are shaped in response to the bosses 7 of the release sheet 6, the bosses 7 in the release sheet 6 are similarly distributed at a similar density as in the small valleys 3.

It is undesirable that the distribution density of the small valleys 3 is less than 10 valleys/cm², since the effect of preventing blistering is worsened in this case. It is also undesirable that the density exceeds 10,000 valleys/cm², since the desired adhesion strength cannot be obtained in this case.

From the viewpoint of preventing blistering, it is particularly preferable that the small valleys 3 are uniformly distributed on the basic flat face.

Similarly, it is preferable that the small peaks 4, which exist in a large number on the basic flat face, are scattered at intervals among one another. In the case where the small peaks 4 exist at an excessively high density, the contact area with the adherend is reduced and sufficient adhesion strength cannot be obtained even with strong pressing. In the case where the small peaks 4 exist at an excessively low density, the space connected to the outside between the pressure-sensitive adhesive layer 2 and the adherend for sticking the pressure-sensitive adhesion-processed sheet to the adherend is reduced. Thus, air cannot be sufficiently eliminated, which might result in the formation of largely uneven blisters.

It is preferable that the small peaks 4 are distributed at a density of from 10 to 10,000 peaks/cm², more preferably at a density of from 15 to 5,000 peaks/cm².

The punch hole structures 8 of the release sheet 6 are similarly distributed at a substantially similar density as in the small peaks 4 of the pressure-sensitive adhesive layer 2.

It is undesirable that the distribution density of the small peaks 4 is less than 10 peaks/cm², since largely uneven blisters are formed and the appearance is seriously worsened in this case. It is also undesirable that the density exceeds 10,000 peaks/cm², since the desired adhesion strength cannot be obtained in this case.

The distribution density of the small peaks 4 on the basic flat face may be either even or uneven, so long as it falls within the range as specified above. In the case where they are evenly distributed, an even adhesion force can be imparted to the entire face of the sheet and the working characteristics are improved. In the case where they are unevenly distributed, it is possible to provide labels having a partly lowered adhesion force or the like which are applicable to coupon labels, etc.

It is preferable that the maximum width of the bottom of the small peaks 4 on the basic flat face is from 1 to 1,500 μm, more preferably from 3 to 1,000 μm.

It is undesirable that the maximum width of the bottom of the small peaks 4 is less than 1 μm, since a minor amount of air or gas between the pressure-sensitive adhesive layer 2 and the adherent cannot be incorporated thereinto and thus blistering arises in this case. It is undesirable that the maximum width of the bottom of the small peaks 4 exceeds 1,500 μm, since the ratio of the basic flat face area is lowered and the desired adhesion strength cannot be obtained in this case.

The sheet base material 1 of the pressure-sensitive adhesion-processed sheet according to the present invention can be decorated by various printing methods. As the printing methods, it is needless to say that use can be made of printers of, for example, electrophotographing system, melt heat transfer system, sublimation heat transfer system, rewritable marking system and inkjet system. Moreover, various printing systems such as relief printing, gravure printing, flexo printing, solvent type offset printing, UV light-hardening offset printing and screen-printing are applicable.

EXAMPLES

To further illustrate the present invention, the following Examples, Comparative Example and Test Example will be given. The materials, amounts, ratios, treatments, procedures and so on given in the following Examples can be appropriately altered without departing from the spirit of the present invention. That is, the scope of the present invention shall not be understood as being restricted to the following Examples.

Example 1

A polypropylene film of 60 μm in thickness (trade name: PYLEN P2761 manufactured by Toyobo Co., Ltd.) was punched through by using the hot needle punching method. Then the face having rolled up parts of the punch holes was treated with silicone to give a release sheet 6. The hole diameter was 400 μm, the hole density was 60 holes/cm², the hole depth was 120 μm and the height of the bosses 7 formed along the periphery of the punch holes was 60 μm.

Next, a synthetic paper of 80 μm in thickness (trade name: SGS-80, manufactured by Yupo Corporation) employed as a sheet base material 1 was coated with a solvent type acrylic pressure-sensitive adhesive (trade name: ORIBAIN BPS1109, manufactured by Toyo Ink Co., Ltd.) employed as a pressure-sensitive adhesive layer 2 with a comma coater so as to give a coating amount after drying of 30 g/m² and dried. Thus a pressure-sensitive adhesion-processed sheet (sheet base material 1+pressure-sensitive adhesive layer 2) was obtained.

On this pressure-sensitive adhesion-processed sheet, the release sheet 6 was overlaid in such a manner that the silicone-coated face of the release sheet 6 came into contact with the pressure-sensitive adhesive layer to give a pressure-sensitive adhesion-processed sheet. Table 1 shows the physical properties of the pressure-sensitive adhesion-processed sheet thus obtained.

Example 2

From a marketed pressure-sensitive adhesion-processed sheet of 190 μm in thickness (trade name: XJP-190, manufactured by Yupo Corporation), the release paper was peeled off. Then the release sheet 6 obtained in Example 1 was overlaid thereon in such a manner that the silicone-coated face of the release sheet 6 came into contact with the pressure-sensitive adhesive layer of the pressure-sensitive adhesion-processed sheet 2 to give a pressure-sensitive adhesion-processed sheet. Table 1 shows the physical properties of the pressure-sensitive adhesion-processed sheet thus obtained.

Example 3

The silicone-treated face of the release sheet 6 obtained in Example 1 was coated with a solvent type acrylic pressure-sensitive adhesive (trade name: ORIBAIN BPS1109, manufactured by Toyo Ink Co., Ltd.) employed as a pressure-sensitive adhesive layer 2 with a bar coater so as to give a coating amount after drying of 30 μm and dried. Thus a laminate (pressure-sensitive adhesive layer 2+release sheet 6) was obtained.

Next, the pressure-sensitive adhesive layer 2 face of this laminate was overlaid on a synthetic paper of 80 μm in thickness (trade name: SGS-80, manufactured by Yupo Corporation) employed as a sheet base material 1 to give a pressure-sensitive adhesion-processed sheet. Table 1 shows the physical properties of the pressure-sensitive adhesion-processed sheet thus obtained.

In Examples 1 to 3, the materials employed (the sheet base materials, the pressure-sensitive adhesives, the release sheets, etc.) are usually available for a person skilled in the art and no specific processing instrument or processing condition were employed except for preliminarily punching the release sheet. Accordingly, a pressure-sensitive adhesion-processed sheet contributing to the solution of the problems could be economically obtained neither requiring any special members or processing steps, as in the techniques having been proposed so far, nor lowering the productivity or elevating the cost.

Comparative Example 1

A polypropylene film of 60 μm in thickness (trade name: PYLEN P2761 manufactured by Toyobo Co., Ltd.) was treated with silicone to give a release sheet 6. Subsequently, the procedure of Example 1 was followed but omitting the punching treatment to give a pressure-sensitive adhesion-processed sheet. Table 1 shows the physical properties of the pressure-sensitive adhesion-processed sheet thus obtained.

Test Example (Depth of Small Valleys 3 and Height of Small Peaks 4)

The depth of the small valleys 3 and the height of the small peaks 4 formed on the pressure-sensitive adhesive layer 2 in each of the above Examples and Comparative Example were calculated by the above-described method.

(Working Characteristics)

The release sheet 6 of each of the above Examples and Comparative Example was peeled off and lightly stuck to a transparent and highly smooth glass glue. Then it was peeled off again and wrinkles, residual glue and easiness in peeling were judged in accordance with the following criteria.

A: being easily peeled without showing wrinkles or residual glue.
B: having difficulties in peeling and showing wrinkles and residual glue.

(Prevention of Blistering)

The release sheet 6 of each of the above Examples and Comparative Example was peeled off and lightly stuck to a transparent and highly smooth glass glue. Then it was manually pressed with the use of a baren and the presence or absence of blisters was judged with the naked eye in accordance with the following criteria.

A: no blister observed.
B: large and uneven blisters observed.

Table 1 shows the evaluation and judgment results in each Test Example.

TABLE 1

| | Average thickness | | | | | | Evaluation | |
| --- | --- | --- | --- | --- | --- | --- | --- | --- |
| Item | Sheet base material 1 (μm) | Pressure-sensitive adhesive layer 2 (μm) | Release sheet 6 (μm) | Whole sheet (μm) | Depth of small valley 3 (μm) | Height of small peaks 4 (μm) | Working characteristics (sensory evaluation) | Prevention of blistering (observation with naked eye) |
| EX-1 | 80 | 30 | 60 | 170 | 23 | 24 | A | A |
| EX-2 | 120 | 20 | 60 | 200 | 15 | 10 | A | A |
| EX-3 | 80 | 25 | 60 | 165 | 25 | 80 | A | A |
| C. EX-1 | 80 | 30 | 60 | 170 | 0 | 0 | B | B |

Although the present invention has been illustrated in detail by reference to specific embodiments, it is obvious that various changes and modifications may be made by one skilled in the art without departing from the spirit and scope of the invention.

As Table 1 clearly shows, the pressure-sensitive adhesion-processed sheet according to the present invention can be easily re-stuck without forming large and uneven blister during and after the working operation of the sheet. Therefore, it is preferably usable in large-sized stickers, labels, signs, name tags, tacky sheets and so on.

Obviously, numerous additional modifications and variations of the present invention are possible in light of the above teachings. It is therefore to be understood that within the scope of the appended claims, the present invention may be practiced otherwise than as specifically described herein.

The invention claimed is:

1. A release sheet to contact a pressure-sensitive adhesive on a sheet base material, the release sheet comprising:

plural punch hole structures and plural bosses formed at edges of the plural punch hole structures, wherein the plural bosses are opposite respective of plural small valleys extending into the pressure-sensitive adhesive layer, without extending through all of said pressure-sensitive adhesive layer.

2. A release sheet as claimed in claim 1, wherein the plural bosses and plural punch hole structures are formed by punching.

3. A release sheet as claimed in claim 1, which comprises a thermoplastic resin.

4. A release sheet as claimed in claim 1, wherein the thickness of the bosses is larger by 1 μm or more than the thickness of the non-punched part.

5. A pressure-sensitive adhesion-processed sheet comprising:
   a sheet base material;
   a pressure-sensitive adhesive layer including plural small valleys extending into the pressure-sensitive adhesive layer, without extending through all of said pressure-sensitive adhesive layer, and plural small peaks; and
   a release sheet including plural punch hole structures and plural bosses formed at edges of the plural punch hole structures, wherein the plural bosses are opposite respective of the plural small valleys.

6. A pressure-sensitive adhesion-processed sheet as claimed in claim 5, wherein the pressure-sensitive adhesive layer has a basic flat face in the face being in contact with the release sheet and the small valleys cave in the basic flat face and the small peaks protrude from the basic flat face.

7. A pressure-sensitive adhesion-processed sheet as claimed in claim 5, wherein the depth of the small valleys ranges from 1 μm inward from the basic flat face of the pressure-sensitive adhesive layer into the thickness of the pressure-sensitive adhesive layer, and the height of the small peaks ranges from 1 μm to 150 μm outward from the basic flat face of the pressure-sensitive adhesive layer.

8. A pressure-sensitive adhesion-processed sheet as claimed in claim 5, wherein the cross-sectional shape of the small valleys in a face parallel to the basic flat face is at least one member selected from the group consisting of circular, elliptic, doughnut, crescent and n-gonal (wherein n is a positive integer of 3 or more) shapes, and the cross-sectional shape of the small peaks in a face parallel to the basic flat face is at least one member selected from the group consisting of circular, elliptic, doughnut, crescent, calabash and n-gonal (wherein n is a positive integer of 3 or more) shapes.

9. A pressure-sensitive adhesion-processed sheet as claimed in claim 5, wherein the cross-sectional shape of the small valleys in a face parallel to the basic flat face is at least one member selected from between doughnut and crescent shapes, and the cross-sectional shape of the small peaks in a face parallel to the basic flat face is at least one member selected from among doughnut, crescent and calabash shapes.

10. A pressure-sensitive adhesion-processed sheet as claimed in claim 5, wherein the cross-sectional shape of the small valleys in a face parallel to the basic flat face is at least one member selected from between doughnut and crescent shapes, and the small peaks are formed adjacent to the small valleys along the outline of the bottom thereof on the basic flat face.

11. A pressure-sensitive adhesion-processed sheet as claimed in claim 5, wherein the small valleys are scattered at intervals among one another on the basic flat face.

12. A pressure-sensitive adhesion-processed sheet as claimed in claim 5, wherein the small peaks are scattered at intervals among one another on the basic flat face.

13. A pressure-sensitive adhesion-processed sheet as claimed in claim 5, wherein the small valleys are distributed at a density of from 10 to 10,000 valleys/cm$^2$ and the small peaks are distributed at a density of from 10 to 10,000 peaks/cm$^2$.

14. A pressure-sensitive adhesion-processed sheet as claimed in claim 5, wherein the maximum width of the bottom of the small peaks on the basic flat face is from 1 to 1,500 μm.

15. A pressure-sensitive adhesion-processed sheet as claimed in claims 5, wherein, in using the pressure-sensitive adhesion-processed sheet, the basic flat face of the pressure-sensitive adhesive layer is constantly in contact with the surface of an adherend so as to provide no continuous space between the pressure-sensitive adhesion-processed sheet and the adherent surface.

* * * * *